Patented Mar. 19, 1929.

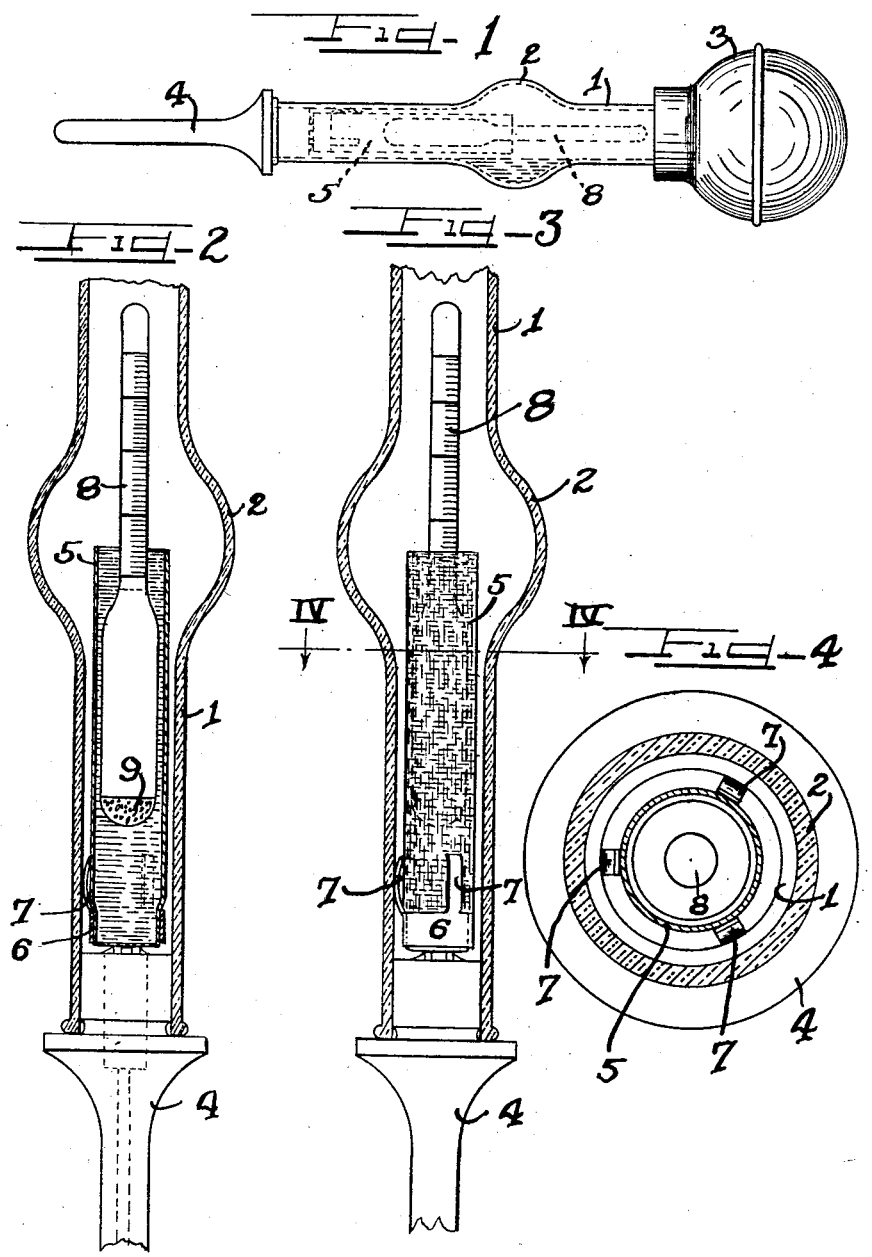

1,706,234

UNITED STATES PATENT OFFICE.

FREDERICK C. JEWELL AND HENRY S. JEWELL, OF CHICAGO, ILLINOIS.

HYDROMETER.

Application filed April 27, 1925. Serial No. 26,006.

This invention relates to hydrometers in general and more particularly to such hydrometers as are adapted for use in testing the density of fluids, such as used in storage batteries. In the hydrometers in general use it is very difficult to obtain an accurate reading due to the difficulty of observing the exact place at which the graduated float meets the surface of the fluid. Among the reasons for this difficulty are the transparency of the fluid being tested and the fact that the fluid has a tendency to slowly exude from the mouth of the hydrometer, allowing air bubbles to come up inside of the hydrometer, thus causing the graduated float to fluctuate.

It is accordingly an object of this invention to provide a hydrometer which will readily facilitate the taking of an accurate reading.

It is also an object of this invention to provide a hydrometer in which the point at which the graduated float meets the surface of the water is quite distinct.

With the above and other objects in view, as will be apparent, this invention consists in the construction, combination and arrangements of parts, all as hereinafter more fully described, claimed and illustrated in the accompanying drawings.

On the drawings:

Figure 1 represents a longitudinal view of a hydrometer device embodying this invention.

Figure 2 is a detail vertical section of the device.

Figure 3 is a detail section with parts in elevation of the device.

Figure 4 is a section at the line IV—IV of Figure 3.

As shown on the drawings:

Referring to Figure 1 numeral 1 represents a glass tube having an increased or bulged portion 2 along its length of spherical shape for a purpose which will be described hereinafter. The tube 1 is adapted to have fitted thereto at one end thereof a bulb 3. The end of the tube 1 opposite the bulb 3 has fitted therein a suitable nozzle 4. Suitably mounted within the outer tube 1 in spaced concentric relation is an inner tube 5 which is secured to and supported by a resilient clip or spacer element 6. The clip member 6 frictionally engages around the lower end of the tube 5 and has integral therewith a series of resilient lugs 7 which are mounted around the periphery of the member 6. The inner tube 5 is open at one end and closed at the lower end as shown more particularly in Figure 2 and is supported within the outer tube 1 by means of the resilient lugs 7 frictionally engaging the inner walls of the outer tube. The inner tube 5 is preferably opaque and of material of a distinctive color. Mounted within the inner tube 5 is the usual graduated float 8 having a weight 9 at the bottom thereof.

The operation:

In using the hydrometer the operator draws the fluid to be tested in through the nozzle 4 to the inside of the outer tube 1 by actuating the bulb 3. When the fluid has risen a sufficient height in the tube 1, it will flow into the inner tube 5 as the said tube is being held in vertical position. When the inner tube 5 has become full, the bulb 3 is squeezed until the rest of the fluid in the outer tube 1 has been forced out. The reading of the hydrometer is then taken, the plane of the upper end of the tube 5 forming a distinct means of gauging the graduation desired to be read from the float 8. After the reading has been taken, the device may be tilted to one side, as shown in Figure 1, so as to allow the tested fluid to flow out of the inner tube 5 into the portion 2 of the outer tube 1 whence it is forced out of the tube 1 by actuating the bulb 3. It will be apparent that by providing this inner tube, a hydrometer device is obtained in which the reading is greatly facilitated.

We are aware that many changes may be made, and numerous details of construction may be varied through a wide range without departing from the principles of this invention, and we therefore do not purpose limiting the patent granted hereon, otherwise than necessitated by the prior art.

We claim as our invention:

1. In a device of the character described, a pair of spaced concentric tubes one enclosing and supporting the other, means for drawing liquid in said tubes, the inner tube being closed at its lower end and a float indicator in said inner tube.

2. In a device of the character described, an outer tube, an inner tube closed at its lower end, means associated with said outer tube for supporting said inner tube, there being a passage between said outer tube and supporting means, means for drawing liquid in said tubes and a float indicator in said inner tube.

3. In a device of the character described, an outer tube, an inner tube closed at its lower end, means associated with said outer tube for supporting said inner tube, there being a passage between said outer tube and supporting means, a float indicator in said inner tube, and means for drawing liquid into said outer and inner tubes.

4. In a hydrometer device, the combination with a float indicator, of an opaque inner tube containing said indicator and closed at its lower end, an outer transparent tube surrounding said first tube and indicator and means for drawing liquid into said tubes.

5. In a hydrometer, an outer transparent tube, an opaque inner tube spaced from said outer tube and closed at its lower end, means for drawing liquid into said tubes, and a float indicator in said inner tube and projecting above the upper open end thereof.

6. In a device of the character described, the combination of a float indicator, an outer transparent tube, an inner tube containing said indicator and closed at its lower end, means for drawing liquid into said tubes, and spacing means maintaining said tubes in spaced relation to each other.

7. In a device of the character described, the combination of a float indicator, an outer transparent tube, an inner tube containing said indicator and closed at its lower end, spacing means associated with said tubes, said spacing means including a clip associated with one tube and having resilient lugs thereon to engage the other tube.

8. In a device of the character described, an outer tubular transparent member, an inner tubular substantially opaque member open at the upper end thereof, a spacer element maintaining said members in spaced relation to each other, a graduated float in said inner member, and means for drawing liquid into said members and expelling liquid from the outer member.

In testimony whereof we have hereunto subscribed our names.

FREDERICK C. JEWELL.
HENRY S. JEWELL.